(12) United States Patent
Aruga et al.

(10) Patent No.: US 6,980,241 B2
(45) Date of Patent: Dec. 27, 2005

(54) SOLID IMAGE CAPTURING DEVICE, LENS UNIT AND IMAGE CAPTURING APPARATUS INCLUDING AN OPTICAL MASK FOR STORING CHARACTERISTIC DATA

(75) Inventors: Urato Aruga, Suwa (JP); Hideo Nakamura, Suwa (JP)

(73) Assignee: Chinon Kabushiki Kaisha, Nagano (JP)

( * ) Notice: Subject to any disclaimer, the term of this patent is extended or adjusted under 35 U.S.C. 154(b) by 855 days.

(21) Appl. No.: 09/816,762

(22) Filed: Mar. 23, 2001

(65) Prior Publication Data
US 2002/0025163 A1 Feb. 28, 2002

(30) Foreign Application Priority Data
Aug. 30, 2000 (JP) .............................. 2000-261646

(51) Int. Cl.[7] .......................... H04N 5/217; H04N 9/64
(52) U.S. Cl. ..................... 348/241; 348/243; 348/246
(58) Field of Search ................................. 348/241–250

(56) References Cited

U.S. PATENT DOCUMENTS

| | | | | |
|---|---|---|---|---|
| 4,649,430 A | * | 3/1987 | Hynecek ..................... 348/245 |
| 5,040,068 A | * | 8/1991 | Parulski et al. .............. 348/376 |
| 5,486,853 A | * | 1/1996 | Baxter et al. ............. 348/222.1 |
| 5,608,455 A | * | 3/1997 | Oda ............................ 348/295 |
| 5,719,625 A | * | 2/1998 | Tani ............................ 348/241 |
| 5,729,288 A | * | 3/1998 | Saito ........................... 348/243 |
| 6,061,092 A | * | 5/2000 | Bakhle et al. ............... 348/243 |
| 6,084,634 A | * | 7/2000 | Inagaki et al. .............. 348/294 |
| 6,101,287 A | * | 8/2000 | Corum et al. ............... 382/274 |
| 6,130,712 A | * | 10/2000 | Miyazaki et al. ........... 348/243 |
| 6,157,407 A | * | 12/2000 | Kobayashi ................... 348/241 |
| 6,418,241 B1 | * | 7/2002 | Schreiner .................... 382/263 |
| 6,480,228 B1 | * | 11/2002 | Yoshihara et al. .......... 348/312 |
| 6,573,931 B1 | * | 6/2003 | Horii et al. ............. 348/211.14 |
| 6,614,473 B1 | * | 9/2003 | Kijima ........................ 348/243 |

* cited by examiner

Primary Examiner—Thai Tran
Assistant Examiner—Kelly Jerabek
(74) Attorney, Agent, or Firm—Darby & Darby

(57) ABSTRACT

A solid image capturing device outputs image data and characteristic data of the solid image capturing device on the same output signal line. Both outputs are processed by the same circuit. In one embodiment, the characteristic data is optically stored in the solid image capturing device. In another embodiment, the characteristic data is non-optically stored in the solid image capturing device. The image field of the solid image capturing device includes an invalid image field located outside the effective image field. Signals output from the invalid image field include those concerning the characteristic data of the solid image capturing device.

11 Claims, 10 Drawing Sheets

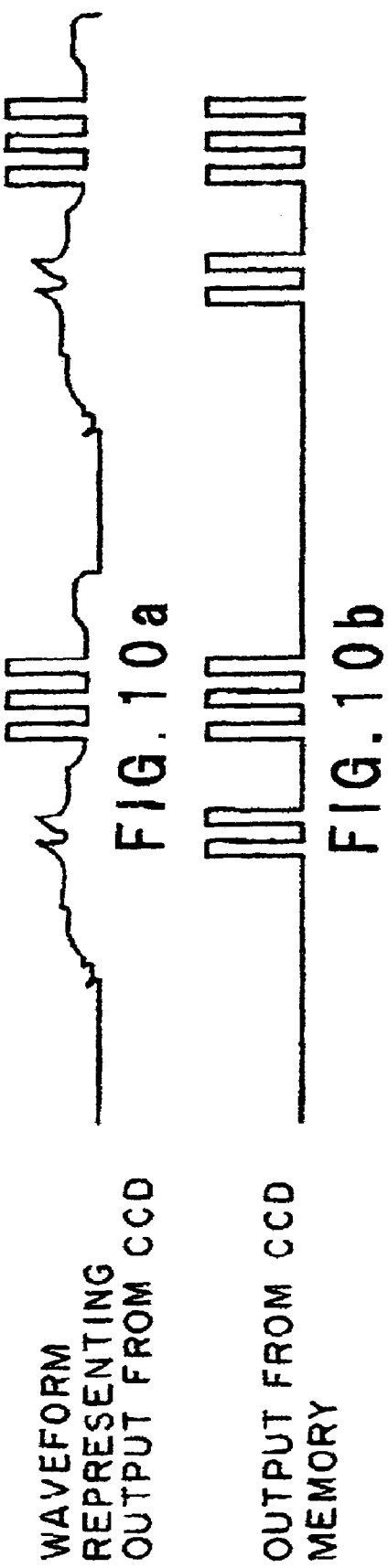

SOLID IMAGE CAPTURING DEVICE, LENS UNIT AND IMAGE CAPTURING APPARATUS INCLUDING AN OPTICAL MASK FOR STORING CHARACTERISTIC DATA

BACKGROUND OF THE INVENTION

The present invention relates to a solid image capturing device, also called a solid state image capturing device, a lens unit and an image capturing apparatus adapted to be used for image capturing.

Conventionally, a solid image capturing device, e.g. a CCD (Charge Coupled Device) or an MOS (Metal Oxide Semiconductor), is used in an image capturing apparatus, such as a digital camera or a video camera.

Because these solid image capturing devices have their own characteristics, such as defective pixels or the like, it is necessary to correct defects in the pixels or to make other corrections required by the characteristics of each device in order to obtain images of good quality.

For example, Japanese Patent Publication No. 13549/1985 discloses an image capturing apparatus which includes a noise eliminating circuit for correcting defective pixels. As shown in FIG. 9, this image capturing apparatus has a CCD 3, which is adapted to conduct photoelectric transfer of an optical image of the subject 2 formed through a lens 1 to produce output signals that result from the conversion. A CCD memory device 4 serves as a noise eliminating circuit by outputting photoelectrically received defect data of the CCD 3. The defect data of the CCD 3 is optically stored in an optical mask 5. The defect data stored in the optical mask 5 is picked up by the CCD memory device 4 using light from a light source 6.

A single driving pulse generating circuit 7 drives both the CCD 3 and CCD memory device 4 by feeding them driving pulses. Outputs from the CCD 3 and the CCD memory device 4 are shown in FIG. 10. Outputs from the CCD 3 and the CCD memory device 4 are respectively processed by different circuits. Outputs from the CCD memory device 4 are processed by a circuit 8, consisting of a waveform shaping circuit and a sample holding circuit. The output of the sample holding circuit is used as gate input into a sample holding circuit 9, which processes outputs from the CCD 3 to correct defects in the CCD 3. Corresponding to defective points in the effective image field of the CCD 3, the CCD memory device 4 reads out data using the effective image field of the CCD memory device 4.

In addition to a solid image capturing device, other memories are also provided. For example, an image capturing apparatus disclosed in Japanese Utility Model Provisional Publication No. 122374/1987 includes a solid image capturing device and a ROM serving as a memory. The ROM is separate from the solid image capturing device. The ROM is dedicated to saving data characteristics to the solid image capturing device so that the data characteristics (defect data, for example) of the solid image capturing device is output from the memory and processed, by a processing circuit or the like, separately from image data, which is output from the solid image capturing device.

In addition to a solid image capturing device, an image capturing apparatus also includes a lens and a main body of the image capturing apparatus. The image capturing apparatus includes a processing circuit for processing image data output from the solid image capturing device. Because the solid image capturing device has its own characteristics, these elements are designed to be exclusively used for the particular solid image capturing device.

In order to read out properties characteristic to the solid image capturing device, the conventional design described above requires a CCD memory device 4 provided separately from an image capturing CCD 3. In other words, a circuit 8, which is separate from the circuit for processing output from the CCD 3, must be used for processing output from the CCD memory device 4. This results in an increased number of parts, a complicated configuration and an increase in size.

Because each solid image capturing device has its own characteristics, a conventional image capturing apparatus has a configuration that is different for each respective solid image capturing device. This means that different image capturing apparatuses have to be developed exclusively for each and every different kind of solid image capturing device. This presents a particularly serious problem when a new generation of solid image capturing devices appears on the market to replace older types of solid image capturing devices. The difficulty arises because it is impossible to cope with such changes immediately. The development and market entry for a new image capturing apparatus is likely to take a long period of time.

OBJECTS AND SUMMARY OF THE INVENTION

In order to solve the above problem, an object of the present invention is to provide a solid image capturing device having a lens unit and an image capturing apparatus. These elements are capable of processing not only image data but also the characteristic data of the solid image capturing device by means of a single circuit without necessitating a special, separate memory or means of obtaining characteristic data of the solid image capturing device.

A solid image capturing device according to an embodiment of the invention is a solid image capturing device for conducting photoelectric conversion of an optical image which has been optically formed, and outputting signals resulting from the photoelectric conversion. The image data and the characteristic data of the solid image capturing device are output from the same output terminal.

With the configuration as above, image data and the characteristic data of the solid image capturing device are output from the same output terminal. There is thus no need for a dedicated memory or other particular means to obtain the characteristic data of the solid image capturing device. Therefore, it is possible to process image data and the characteristic data of the solid image capturing device using the same circuit.

A solid image capturing device according to the invention is a solid image capturing device as above, wherein the image field of the solid image capturing device includes an effective image field and an invalid image field located outside the effective image field. From among the data output from the entire image field, the characteristic data of the solid image capturing device is included in the data output from the invalid image field.

With the configuration as above, of the data output from the image field that has an effective image field and an invalid image field located outside the effective image field, the characteristic data of the solid image capturing device is included in the data output from the invalid image field. Therefore, while having the same effect as that of a solid image capturing device described above, the solid image capturing device of the invention enables the effective use of the invalid image field without exerting an influence on the effective image field.

A solid image capturing device according to a further embodiment of the invention is a solid image capturing device, wherein the solid image capturing device has an optical mask that covers the invalid image field and includes a memory field adapted to optically store the characteristic data of the solid image capturing device.

Because the optical mask that covers the invalid image field includes a memory field adapted to optically store the characteristic data of the solid image capturing device, both the image data and the characteristic data of the solid image capturing device can easily be output from the same output terminal by merely incorporating an optical mask into the solid image capturing device.

A solid image capturing device according to the invention is a solid image capturing device wherein the invalid image field includes a memory field which is comprised of a non-optical means adapted to store the characteristic data of the solid image capturing device.

Because the invalid image field includes a memory field which is comprised of a non-optical means adapted to store the characteristic data of the solid image capturing device, the solid image capturing device of the invention ensures reliable output of the characteristic data of the solid image capturing device.

A lens unit of the invention includes a lens and a solid image capturing device which has a configuration as described above. The image capturing device is integrally combined with the lens.

By integrally combining a solid image capturing device with a lens unit, the characteristics of each solid image capturing device can be determined by a component incorporated in the main body of the image capturing apparatus regardless of whether the lens unit currently mounted on the main body of the image capturing apparatus is replaced with another lens unit. Therefore, the lens unit is applicable to a camera system adapted to freely use interchangeable lens units respectively provided with solid image capturing devices of different types.

An image capturing apparatus according to the invention includes a solid image capturing device, a processing circuit for processing data output from the solid image capturing device, and a determining means for determining the characteristic data of the solid image capturing device processed by the processing circuit.

By using a solid image capturing device as disclosed herein, and following a procedure that provides for data output from the solid image capturing device to be processed by means of a processing circuit and the characteristic data of the solid image capturing device processed by the processing circuit to be determined by a determining means, the characteristic data of the solid image capturing device, which is processed together with image data, is determined.

An image capturing apparatus according to the invention includes a main body of the image capturing apparatus, and a lens unit. The lens unit is adapted to be interchangeably mounted on the main body of the image capturing apparatus.

By using a lens unit, an image capturing apparatus according to the invention provides a camera system which determines the characteristics of each solid image capturing device using a component incorporated in the image capturing apparatus body, regardless of whether the lens unit currently used is replaced with another lens unit. This permits the use of interchangeable lens units provided with solid image capturing devices of different types.

An image capturing apparatus according to the invention includes a main body of the image capturing apparatus, and a solid image capturing device. The solid image capturing device is adapted to be interchangeably mounted on the main body of the image capturing apparatus.

With the configuration as above, an image capturing apparatus provides a camera system which is adapted to freely use interchangeable solid image capturing devices of different types, because even if the solid image capturing device currently used is replaced with another solid image capturing device, the characteristics of each solid image capturing device is determined by a component incorporated in the image capturing apparatus body.

An image capturing apparatus according to the invention includes the main body of the image capturing apparatus with a processing circuit for processing data that has been output from the solid image capturing device. A determining means determines data that is characteristic to the solid image capturing device and processed by the processing circuit.

With the configuration as above, the image capturing apparatus functions in such a manner that data output from the solid image capturing device is processed by the processing circuit. The characteristic data of the solid image capturing device processed by the processing circuit is determined by the determining means. Thus, the characteristic data of the solid image capturing device, which is processed together with image data, is determined.

BRIEF DESCRIPTION OF THE DRAWINGS

FIG. 10a is a waveform chart representing output from a CCD of the conventional image capturing apparatus.

FIG. 10b is a waveform chart representing output from a CCD memory of the conventional image capturing apparatus.

DETAILED DESCRIPTION OF THE INVENTION

Figure 1:
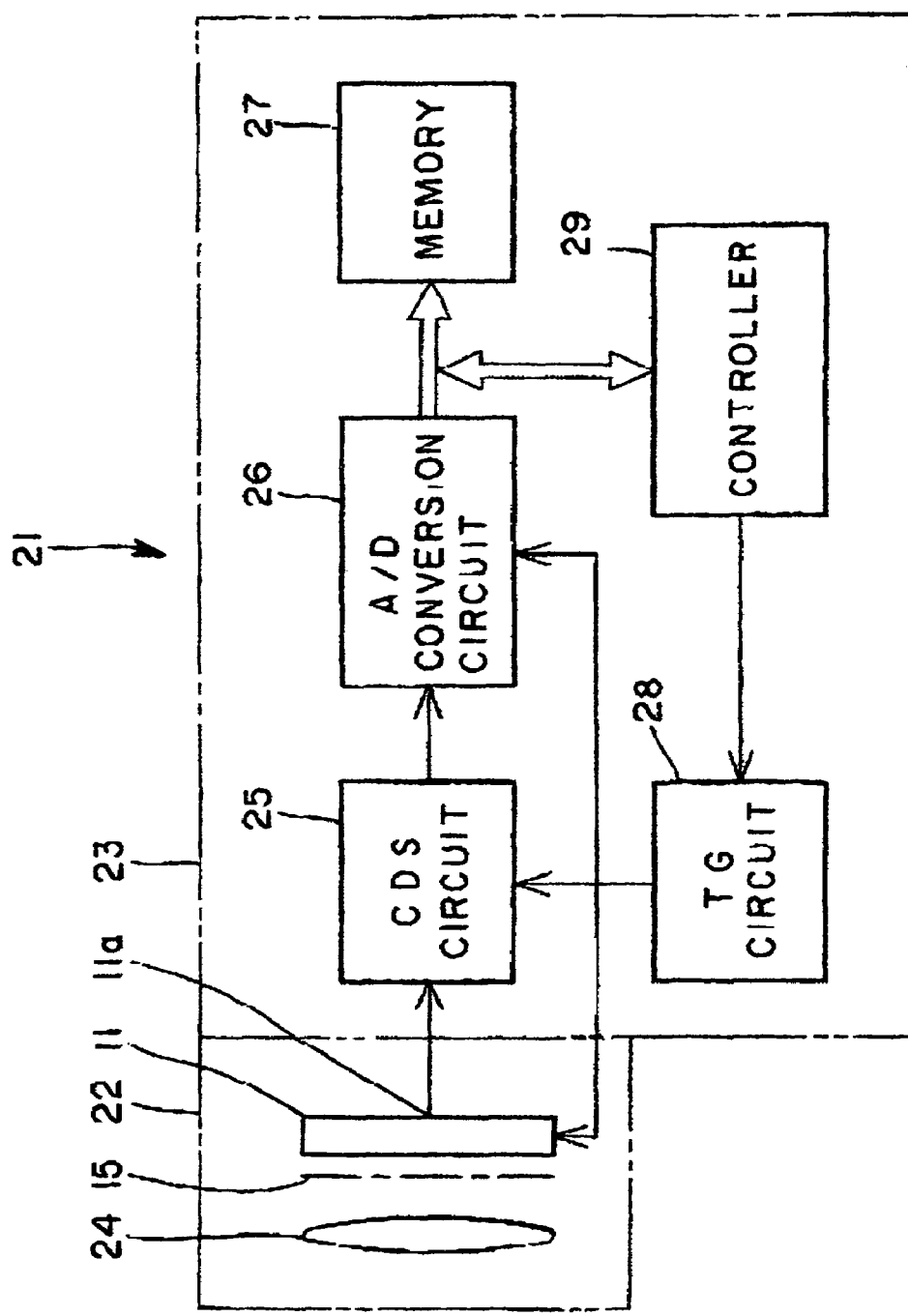
FIG. 1 is a block diagram of a lens unit and an image capturing apparatus using a solid image capturing device according to an embodiment of the present invention.
Figure 2A:
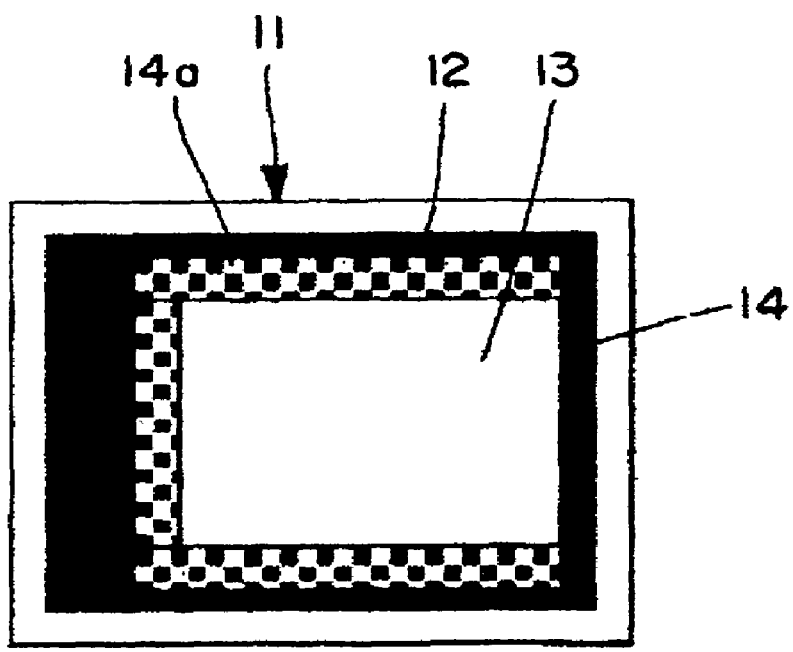
FIG. 2a is a schematic illustration of an image field of the solid image capturing device.
Figure 2B:
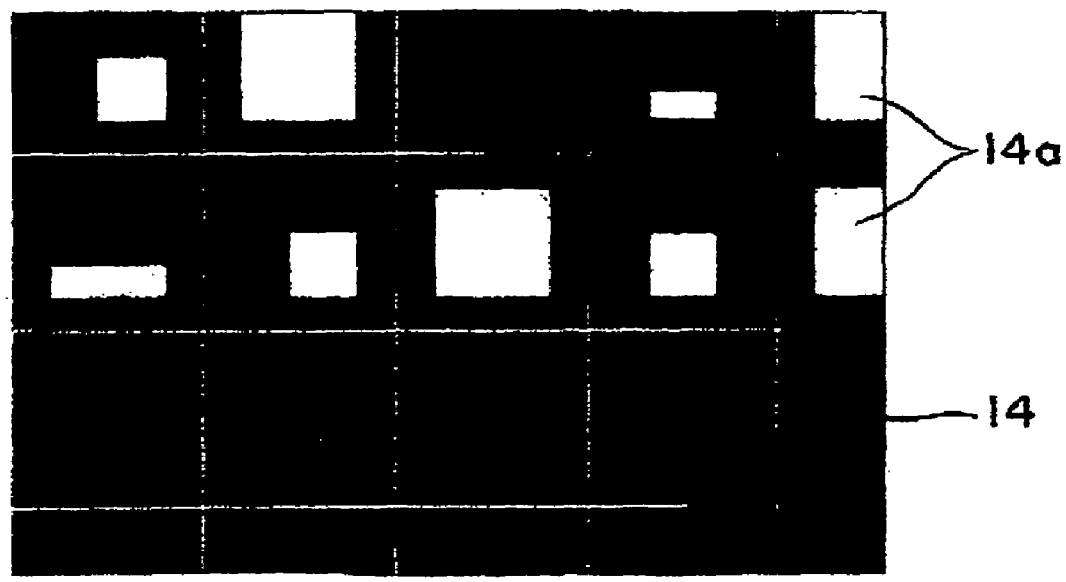
FIG. 2b is an enlarged schematic illustration of an invalid image field of the image field of the solid image capturing device.

Referring to FIGS. 1 through 4, a solid image capturing device (image sensor) 11, which may be, for example, a CCD (Charge Coupled Device) or an MOS (Metal Oxide Semiconductor). A square or rectangular image field 12 is formed on the surface of the solid image capturing device 11. A plurality of pixels for conducting photoelectric transfer of light and outputting signals resulting from the transfer are vertically and horizontally arranged in a matrix in the image field 12. The image field 12 has an effective image field 13 used for actually capturing images and an invalid image field 14, which is located outside the effective image field 13 and not actually used for image capture.

The effective image field 13 and the invalid image field 14 of the image field 12 are defined by an optical mask 15 (see FIG. 1) disposed adjacent to the front face of the solid image capturing device 11. The optical mask 15 has an aperture corresponding to the effective image field 13. A portion of the optical mask 15 surrounding the aperture faces the invalid image field 14 and serves as a light blocking portion. The light blocking portion of the optical mask 15 includes a memory field for optically storing the characteristic data of the solid image capturing device 11. To be more specific, translucent patterns that consist of the characteristic data of the solid image capturing device 11 are formed in the two horizontally extending portions and in one of the two vertical portions of the light blocking portion of the optical mask 15.

When taking a picture, a characteristic data capturing field 14a of the invalid image field 14, which is optically masked by the light blocking portion of the optical mask 15, receives the light that has passed through the translucent patterns. As a result, optically masked black-level data and characteristic data of the solid image capturing device 11 are included in the output from the invalid image field 14. In this case, for example, two values of digital output are obtained for each pixel, resulting in 1-byte data for every 8 pixels.

Therefore, image data and the characteristic data of the solid image capturing device 11 are output from an output terminal 11a of the solid image capturing device 11 (shown in FIG. 1).

The characteristics of the solid image capturing device 11 include an ID code, numbers of pixels (the number of pixels along a horizontal or vertical axis, the number of effective pixels, etc.), the readout method (the progressive method, the interlacing method, etc.), clock rates (the HD frequency, the VD frequency, etc.), the type of color filter (primary colors, complementary colors, no filter, etc.), the dynamic range, presence or absence of a lens, gain, data concerning defective pixels, etc.

Referring now to FIG. 1 an image capturing apparatus 21 may be a digital camera or a video camera. The image capturing apparatus includes a lens unit 22 and a main body 23 of the image capturing apparatus (hereinafter called the image capturing apparatus body 23) on which the lens unit 22 can be mounted interchangeably.

The lens unit has a lens 24. The aforementioned optical mask 15 is mounted inward of the lens 24. The solid image capturing device 11 is positioned at the focal point of the lens 24. The lens unit 22 is formed by arranging the lens 24 and the solid image capturing device 11 into an integral body which is interchangeably mounted on the image capturing apparatus body 23. Mounting the lens unit 22 on the image capturing apparatus body 23 electrically connects the lens unit 22 to the image capturing apparatus body 23.

The image capturing apparatus body 23 has a CDS circuit 25 which receives data from the solid image capturing device 25. An A/D conversion circuit 26 converts the analog data from the solid image capturing device 11 to its digital equivalent. The digital data is then stored in a memory 27. A controller 29 interchanges digital data with the memory 27. In addition, the controller 29 applies control signals to a TG circuit 28. The output of the TG circuit 28 is applied to inputs of the CDS circuit 25, solid image capturing device 11 and the A/D converter 26.

The CDS circuit 25 serves as a processing circuit for processing signals output from the output terminal 11 a of the solid image capturing device 11 of the lens unit 22. The A/D conversion circuit 26 converts analog signals output from the CDS circuit 25 into digital signals. The memory 27 stores the digital signals output from the A/D conversion circuit 26. The TG circuit 28 is a synchronous clock for applying synchronized clock signals to the solid image capturing device 11, the CDS circuit 25 and the A/D conversion circuit 26. The controller 29 controls the TG circuit 28 by reading data from the memory 27. In addition, the controller 29 controls the entire image capturing process.

The A/D conversion circuit 26 is generally a 10 to 12 bit A/D converter. Theoretically speaking, when recognizing characteristic data, which is distinct from image data, an A/D converter of this type is capable of recognizing data in a number of bits corresponding to the capacity of the A/D converter. Even if quantization error is taken into consideration, at least a plurality of bits of data, e.g. 8 bits (1 byte), can be allocated for each pixel.

The controller 29 functions as a determining means for retrieving and determining characteristic data of the solid image capturing device 11 from the memory 27, a driving parameter decision means for deciding driving parameters according to determined characteristics of the solid image capturing device 11, and a control means for control using decided driving parameters.

The driving parameters are set beforehand in accordance with the characteristics of the solid image capturing device 11. The driving parameters are stored in a memory of the controller 29 or in any other appropriate means.

An image of the subject is taken through the lens 24 by the solid image capturing device 11. Signals resulting from photoelectric conversion conducted in the image field 12, which includes the effective image field 13 and the invalid image field 14, are output from the output terminal 11a to the CDS circuit 25. The CDS circuit 25 processes the signals that it receives. Analog signals output from the CDS circuit 25 as a result of processing are converted to digital signals in the A/D conversion circuit 26. Signals then output from the A/D conversion circuit 26 are stored in the memory 27. During the period when image capturing is conducted, the controller 29 controls the TC circuit 28 to feed synchronized clock signals to the solid image capturing device 11, the CDS circuit 25 and the A/D conversion circuit 26, thereby driving these components.

Figure 3:
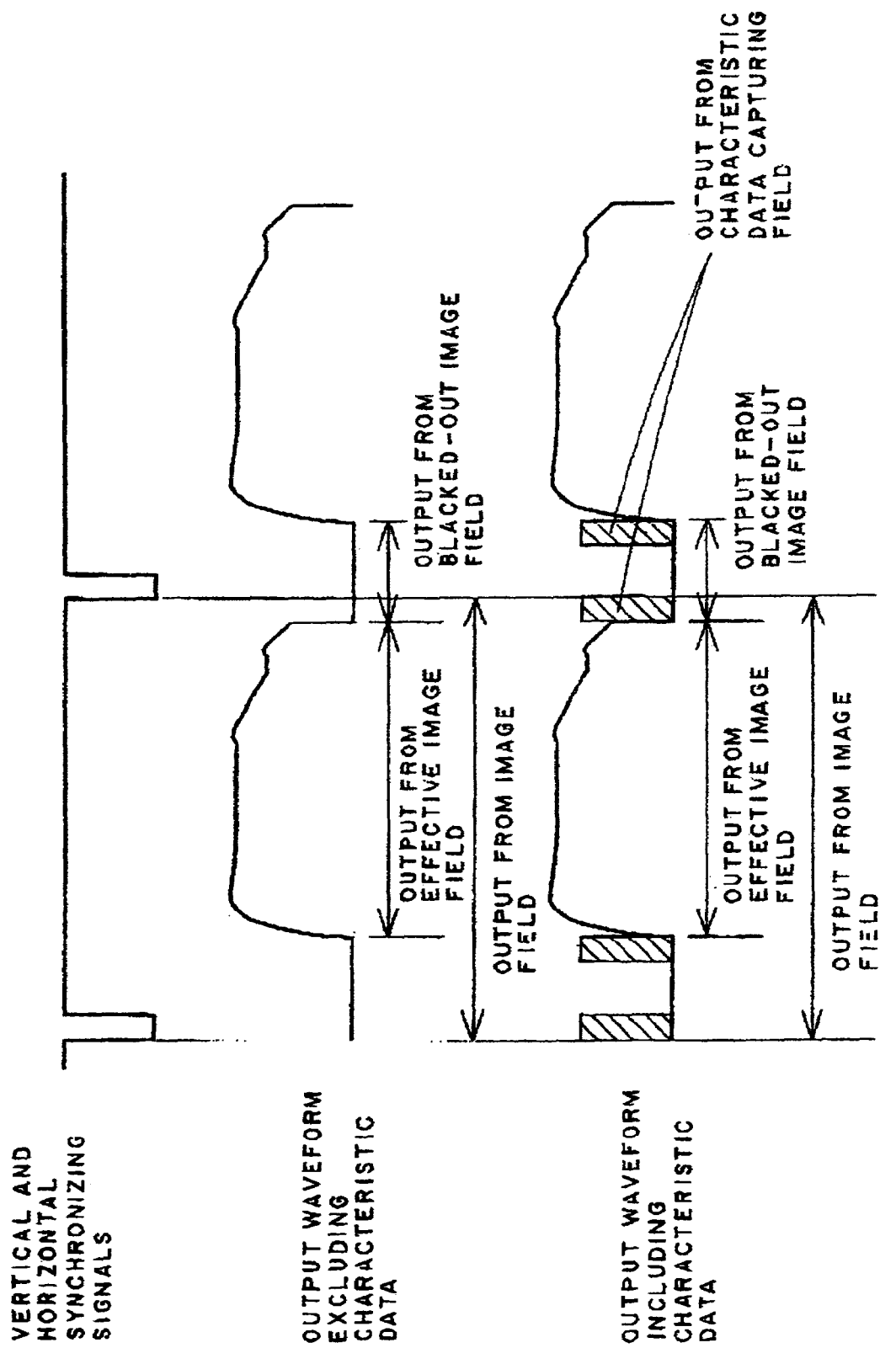
FIG. 3 is a waveform chart showing a waveform of vertical and horizontal synchronizing signals fed to the solid image capturing device, an output waveform excluding characteristic data, and an output waveform including characteristic data.

FIG. 3 represents a waveform chart showing, from top to bottom, a waveform of vertical and horizontal synchronizing signals fed to the solid image capturing device, an output waveform excluding characteristic data and an output waveform including characteristic data.

When the characteristic data of the solid image capturing device 11 is omitted from the output from the solid image capturing device 11, data of the image that has actually been picked up is output from the effective image field 13 of the image field 12 of the solid image capturing device. Optically masked black level data alone is output from the invalid image field 14. This is evident from the middle output waveform, which excludes the characteristic data.

Because it is shown in the output waveform that includes characteristic data, when the characteristic data of the solid image capturing device 11 is included in the output from the solid image capturing device 11, data of the image that has actually been taken is output from the effective image field 13 of the image field 12 of the solid image capturing device. The invalid image field 14 outputs both optically masked black level data and the characteristic data of the solid image capturing device 11. In this case, the characteristic data of the solid image capturing device 11 is output from the characteristic data capturing field 14a.

The signals output from the output terminal 11a of the solid image capturing device 11 are input to the CDS circuit 25, by which the image data output from the effective image field 13 and the data output from the invalid image field 14, i.e. the black level data and the characteristic data of the solid image capturing device 11, are processed.

Figure 4:
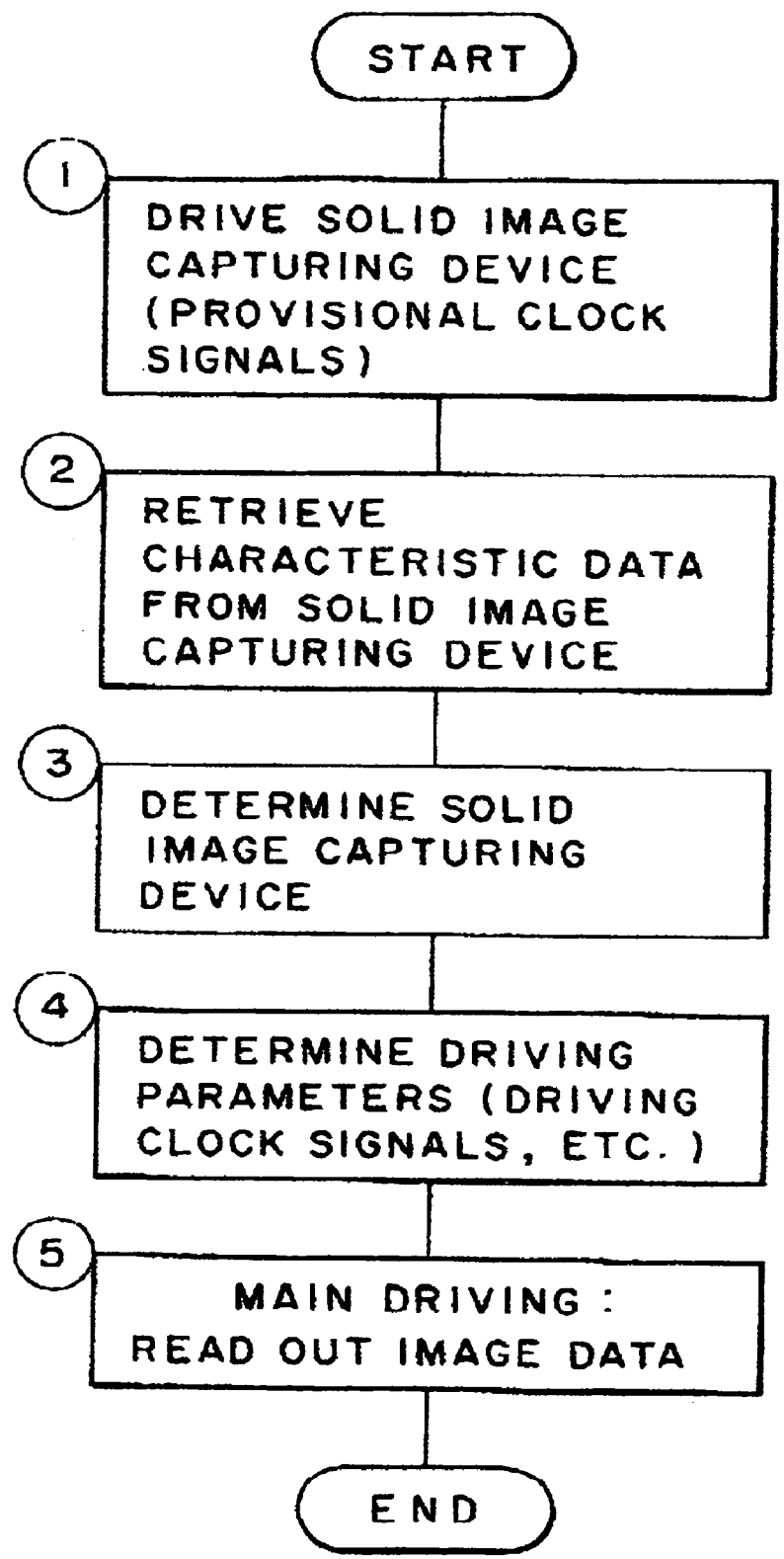
FIG. 4 is a flow chart showing the process of determining the characteristic data of the solid image capturing device.

Referring to FIG. 4, the solid image capturing device 11 is determined by control functions of the controller 29 as follows:

1) First, the TG circuit 28 drives the solid image capturing device 11 by giving it provisional clock signals (Step 1).
2) Then, characteristic data of the solid image capturing device 11 is retrieved from the data that has been picked up by the solid image capturing device 11 and stored in the memory 27 (Step 2).
3) The characteristic data of the solid image capturing device 11 is determined (Step 3).
4) The appropriate driving parameters are determined according to the characteristic data of the solid image capturing device 11 determined as described above (Step 4).
5) The TG circuit 28 drives the solid image capturing device 11 by giving it clock signals based on the determined driving parameters (Step 5).

As a result of the foregoing process, the image capturing function is optimized in accordance with the characteristics of the solid image capturing device 11 to ensure high image quality.

Determination of the characteristic data of the solid image capturing device 11 is automatically conducted when a conventional detecting means (not shown) detects that the lens unit 22 has been mounted on the image capturing apparatus body 23, or when the image capturing apparatus is switched on and put into the standby state.

Although depending on the method of driving the solid image capturing device 11, it is normally possible to selectively obtain pixel signals from the solid image capturing device 11. Therefore, it is possible to retrieve only necessary characteristic data of the solid image capturing device 11. Furthermore, for the same reason as above, it is also possible to retrieve only image data.

Because the solid image capturing device 11 thus outputs image data and the characteristic data of the solid image capturing device 11 from the single output terminal 11a, both the image data and the characteristic data of the solid image capturing device 11 can be processed by the same circuit without the need for a memory or other particular means dedicated to obtaining the characteristic data of the solid image capturing device 11. The embodiment described above thus has a simple configuration with reduced dimensions.

The image field 12 has the effective image field 13 and the invalid image field 14 located outside the effective image field 13 as described above. The data output from the image field 12, includes the characteristic data of the solid image capturing device 11 in the data output from the characteristic data capturing field 14a of the invalid image field 14. The separation of the image data from the characteristic data is easily controlled by the timing of clock signals from the TG circuit 28. Therefore, the embodiment enables the effective use of the invalid image field 14 without influencing the data from the effective image field 13.

Because the optical mask 15 that covers the invalid image field 14 includes a memory field adapted to optically store the characteristic data of the solid image capturing device 11, both the image data and the characteristic data of the solid image capturing device 11 is output easily from the single output terminal 11a by merely incorporating the optical mask 15. The characteristic data in the characteristic data capturing field 14a includes optical digital data which, when processed by succeeding circuits, yields the characteristic data in digital form used for correcting defects in the solid image capturing device 11.

The characteristic data of the solid image capturing device 11, which is processed together with image data, can easily be determined from the solid image capturing device 11 so that data output from the output terminal 11a of the solid image capturing device 11 is processed by the CDS circuit 25 and the characteristic data of the solid image capturing device 11 is processed by the CDS circuit 25 and determined by the controller 29.

The solid image capturing device 11 is integrally incorporated with the lens 24 to compose the lens unit 22. Therefore, when the lens unit 22 currently mounted on the image capturing apparatus body 23 is replaced with another lens unit 22, the characteristics of the newly mounted solid image capturing device 11 is determined by a component incorporated in the image capturing apparatus body 23. Because of this feature, the embodiment is applicable to a camera system adapted to freely use interchangeable lens units 22 respectively provided with solid image capturing devices 11 of different types, such as, for example, those having different numbers of pixels.

In other words, by using a lens unit 22 described above, it is possible to determine the characteristic data of each solid image capturing device 11 by a component incorporated in the image capturing apparatus body 23 regardless of whether the lens unit 22 is replaced with another lens unit 22. Consequently, it is possible to provide a camera system that can freely use interchangeable lens units 22 having solid image capturing devices 11 of different types.

In an alternative configuration, the solid image capturing device 11 may interchangeably mounted on the lens unit 22. In this case, the characteristic data of each solid image capturing device 11 can be determined by a component incorporated in the image capturing apparatus body 23 regardless of whether the solid image capturing device 11 currently used is replaced with another solid image capturing device. Therefore, it is possible to provide a camera system that can freely use interchangeable solid image capturing devices 11 of different types.

Therefore, when used in a camera system equipped with an interchangeable lens unit 22 or solid image capturing device 11, the invention is capable of coping with solid image capturing devices 11 of different types while using the same image capturing apparatus body 23. Unlike conventional systems, there is no need for developing different image capturing apparatuses exclusively for each and every different kind of solid image capturing device. This feature presents a great benefit particularly when a new generation of solid image capturing devices appears on the market to replace the older generation, because the invention can cope with such changes immediately and reduce the length of time required for development of a new device, regardless of whether the solid image capturing device 11 is an interchangeable type or a fixed type.

Figure 5:
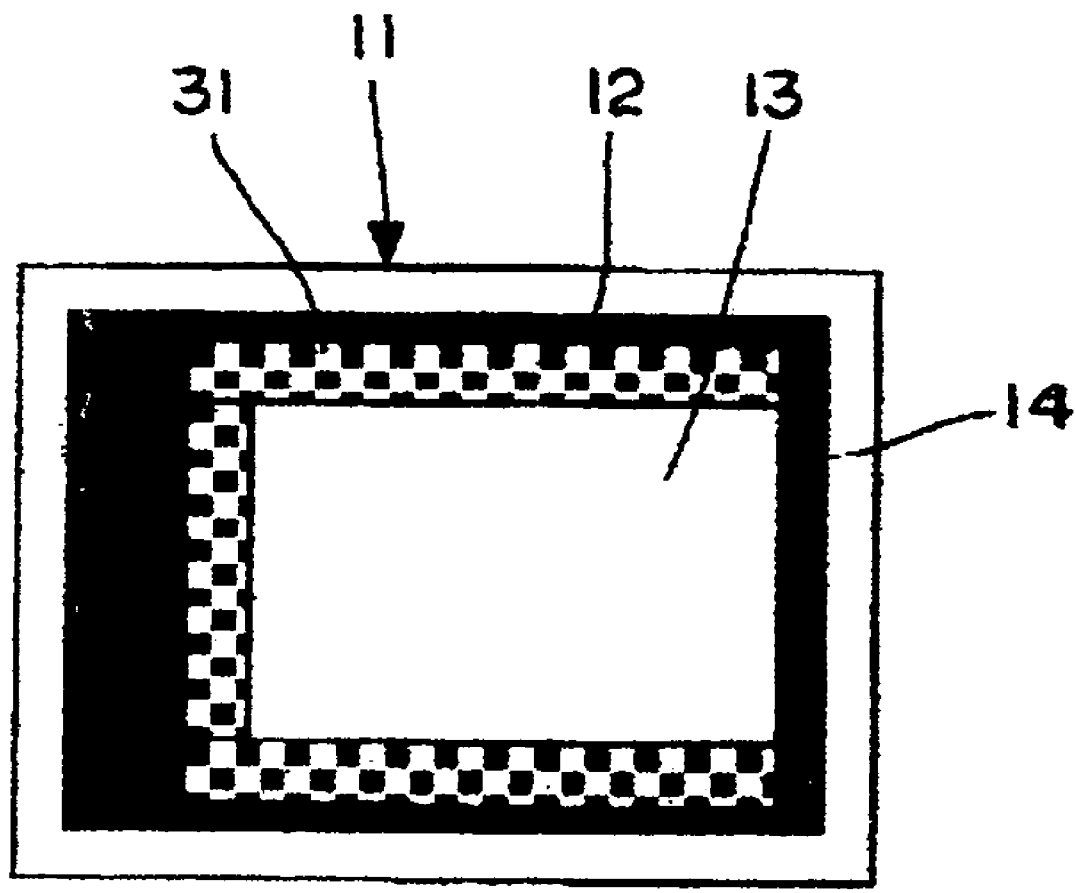
FIG. 5 is a schematic illustration of an image field of a solid image capturing device according to another embodiment of the present invention.

Another embodiment of the invention is shown in FIG. 5, which is a schematic illustration showing the image field 12 of a solid image capturing device.

The invalid image field 14 includes a memory field which stores the characteristic data of the solid image capturing device 11 by a non-optical means. In this embodiment, the non-optical means is a memory field 31, e.g. an EPROM or an EEPROM, adapted to electrically storing data. The memory field 31 is formed as an integral body with the invalid image field 14. The characteristic data of the solid image capturing device 11 is electrically stored in the memory field 31 so that the characteristic data of the solid image capturing device 11 can be output by using the same means as the preceding system which outputs image data. While having the same effect as the embodiment previously described, the present embodiment is capable of increasing the amount of data to be recorded.

The characteristic data of the solid image capturing device 11 may be obtained using data electrically stored in the memory field 31 and data recorded in the memory field of the optical mask 15. By doing so, the amount of data can be increased.

Figure 6:
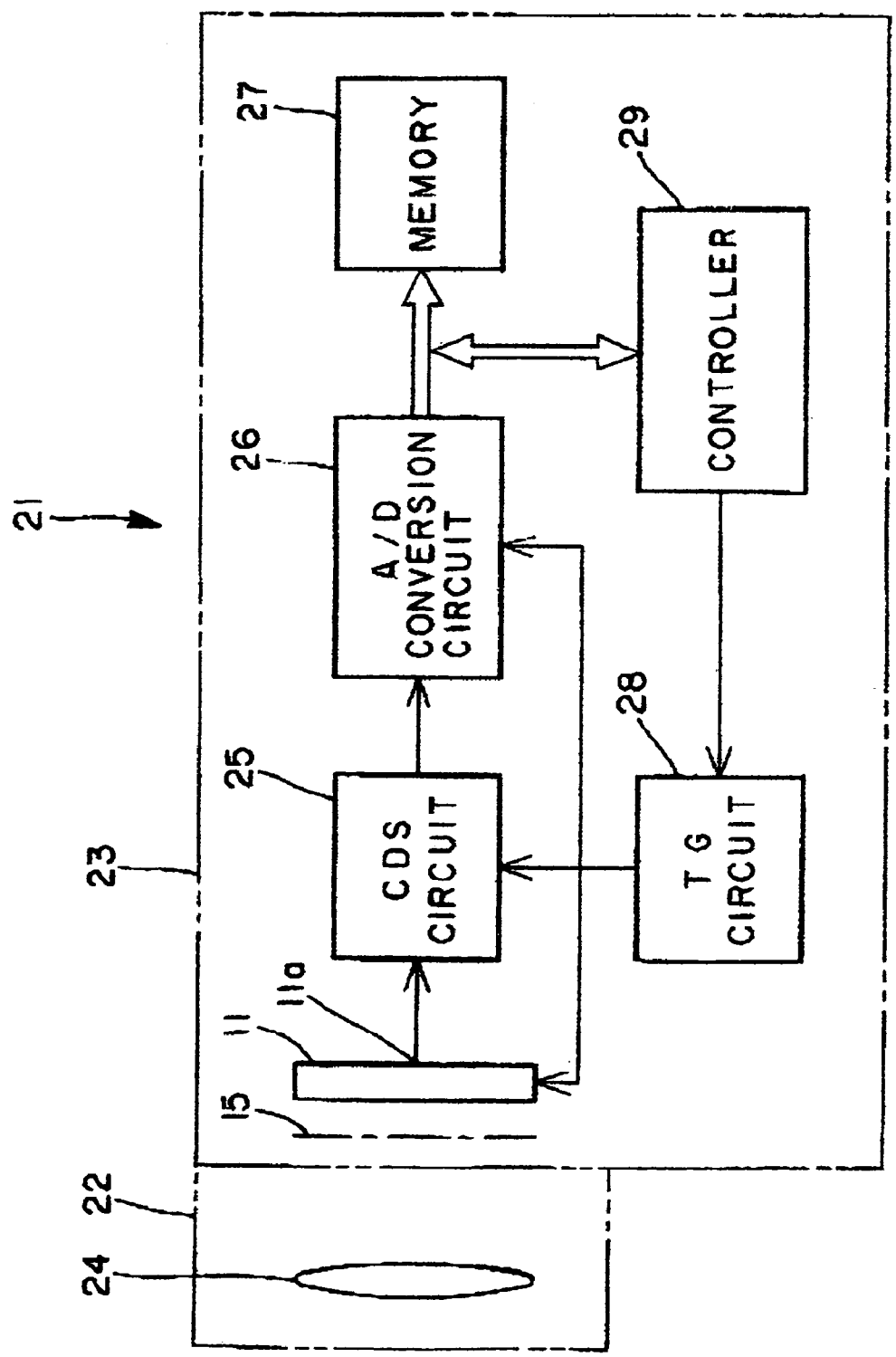
FIG. 6 is a block diagram of an image capturing apparatus according to yet another embodiment of the present invention.

Yet another embodiment of the invention is shown in FIG. 6, which is a block diagram of an image capturing apparatus.

The image capturing apparatus body 23 includes an interchangeable solid image capturing device 11. In this case, the characteristic data of each solid image capturing device 11 can be determined by a component incorporated in the image capturing apparatus body 23 regardless of whether the solid image capturing device 11 currently used is replaced with another solid image capturing device. Therefore, it is possible to provide a camera system that can freely use interchangeable solid image capturing devices 11 of different types.

Figure 7:
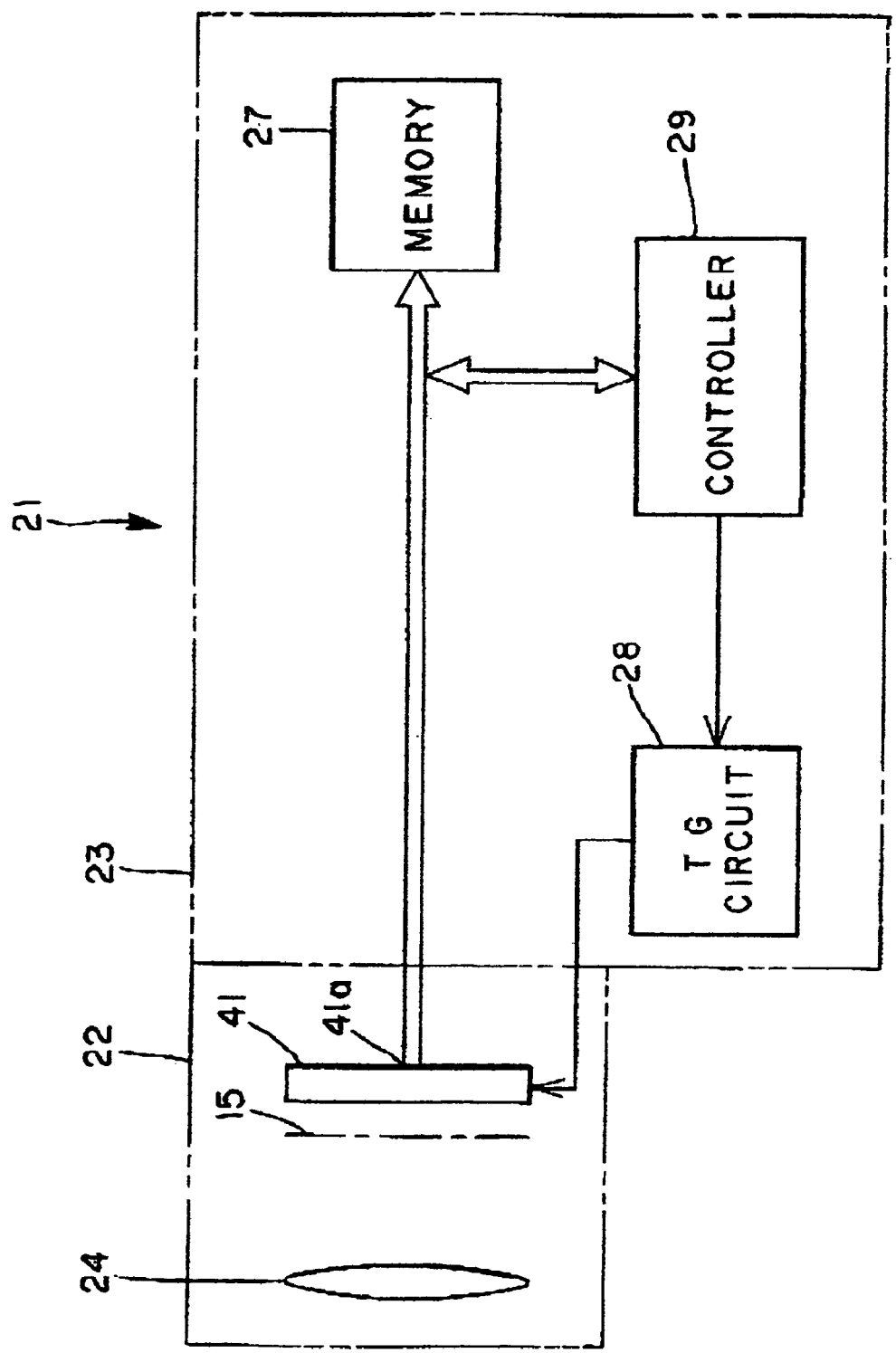
FIG. 7 is a block diagram of a lens unit and an image capturing apparatus using a solid image capturing device according to yet another embodiment of the present invention.
Figure 8:
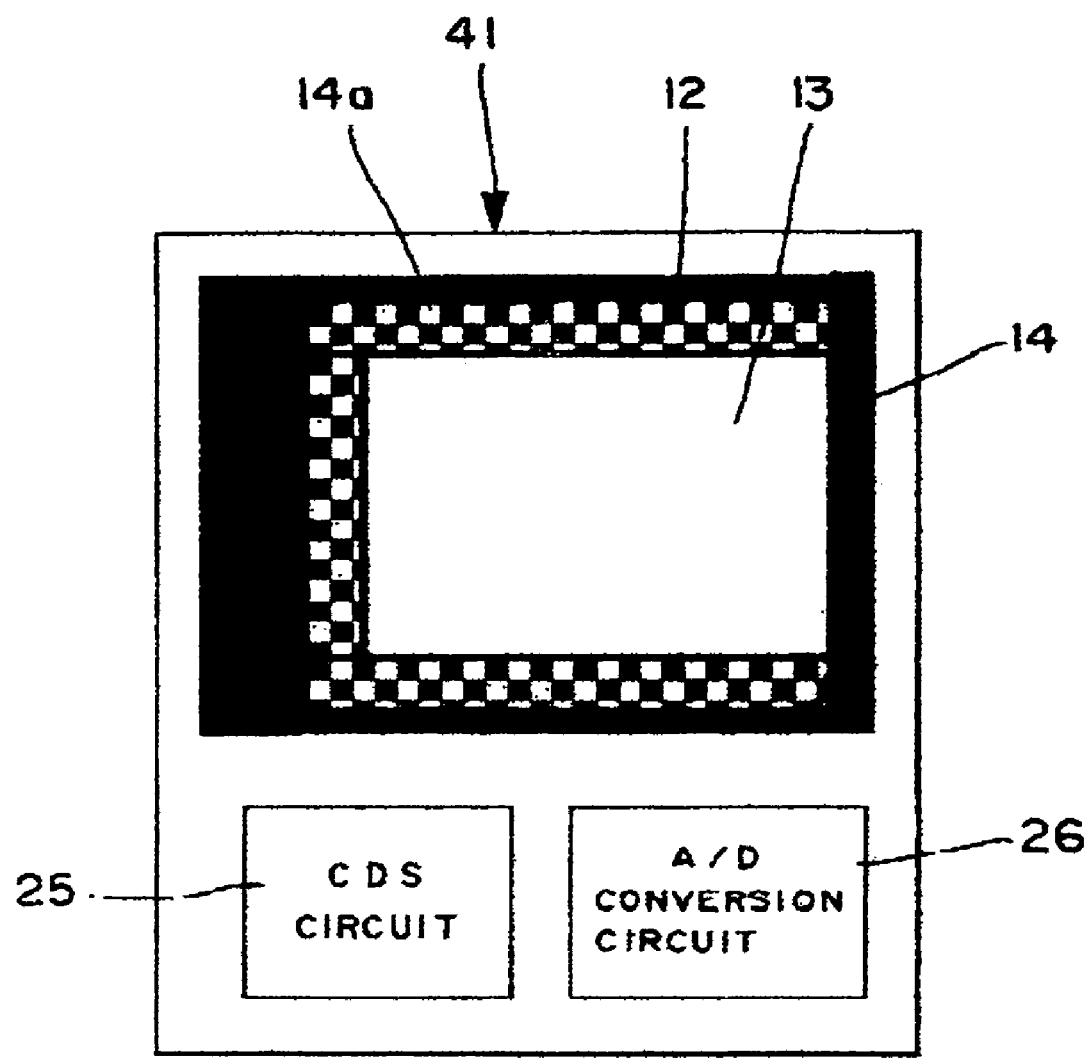
FIG. 8 is a schematic illustration of a substrate on which the solid image capturing device is mounted.
Figure 9:
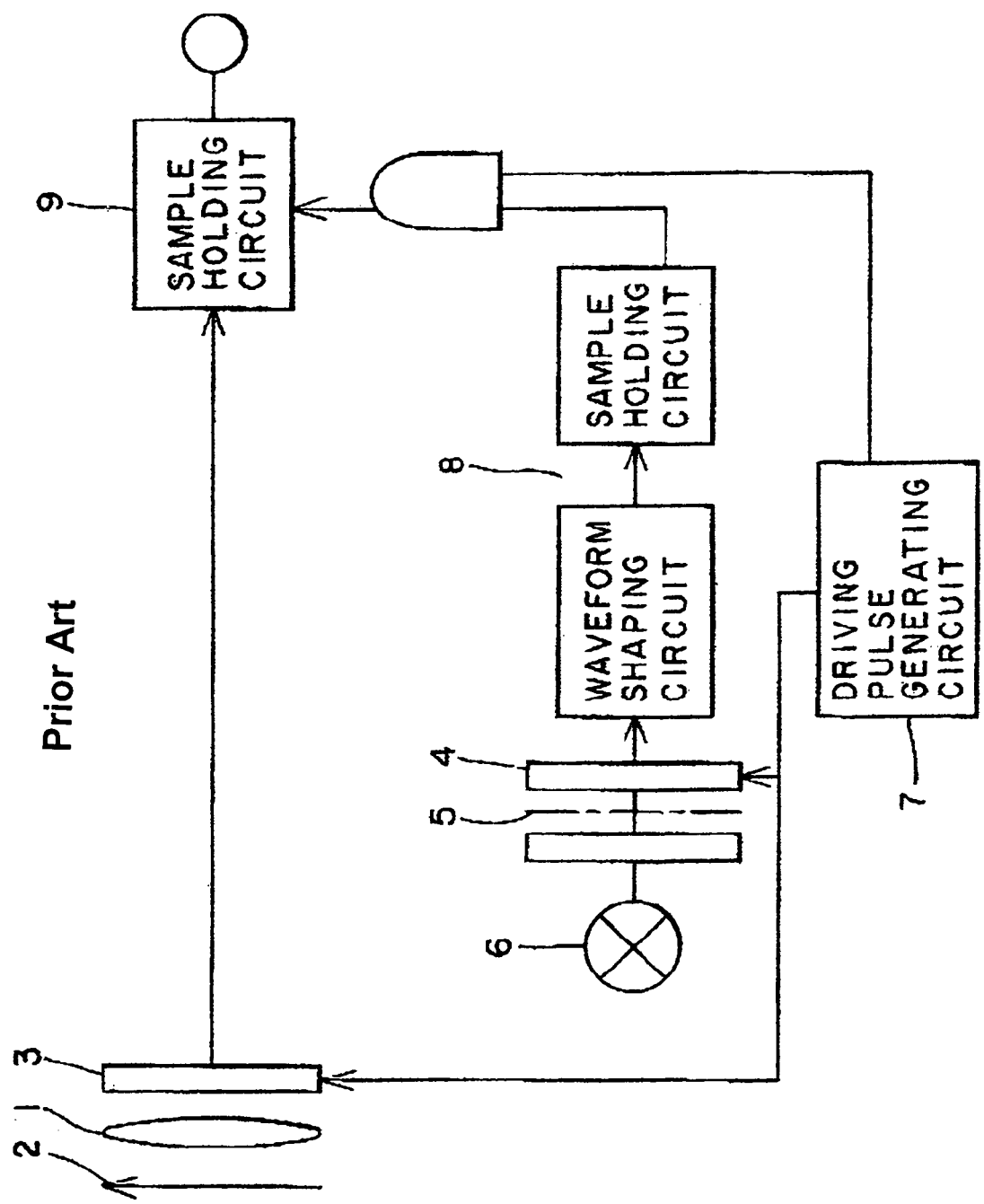
FIG. 9 is a block diagram of a conventional image capturing apparatus.

Yet another embodiment of the invention is shown in FIGS. 7 and 8. FIG. 7 is a block diagram of a lens unit using a solid image capturing device and an image capturing apparatus. FIG. 8 is a schematic illustration of a substrate on which the solid image capturing device is mounted.

As shown in FIG. 8, the solid image capturing device 41 includes an image field 12. A CDS circuit 25 and an A/D conversion circuit 26 are formed on the same semiconductor substrate on which the image field 12 is formed. With the configuration as above, the data output from the solid image capturing device 41, i.e. the image data from the image field 12 and the characteristic data of the solid image capturing device 41 are digitized by means of the CDS circuit 25 and the A/D conversion circuit 26 and output from the same output terminal 41 a (shown in FIG. 7).

By providing a lens unit 22 with a solid image capturing device 41 which includes, not only the elements for image capture, but also, on the same substrate, a CDS circuit 25 and an A/D conversion circuit 26 as shown in FIG. 7. This simplifies the circuit configuration of the image capturing apparatus body 23.

According to the configuration of the solid image capturing device of the invention, image data and the characteristic data of the solid image capturing device are output from the same output terminal. There is no need of a dedicated memory or other particular means to obtain the characteristic data of the solid image capturing device. Therefore, it is possible to process image data and the characteristic data of the solid image capturing device using the same circuit.

The invention thus provides a solid image capturing device having a simplified configuration and reduced dimensions.

According to the configuration of the solid image capturing device, the data output from the image field includes data from has an effective image field and an invalid image field located outside the effective image field. The characteristic data of the solid image capturing device is included in the data output from the invalid image field. Therefore, while having the same effect as that of a solid image capturing device in the preceding paragraph, the solid image capturing device enables the effective use of the invalid image field without having any influence on the image data from effective image field.

According to the configuration of the solid image capturing device, an optical mask that covers the invalid image field includes a memory field is adapted to optically store the characteristic data of the solid image capturing device. While having the same effect as that of a solid image capturing device described above, this solid image capturing device has the additional benefit that both the image data and the characteristic data of the solid image capturing device can be output from the same output terminal by merely incorporating an optical mask into the solid image capturing device.

According to the configuration of the solid image capturing device if the invention, the invalid image field includes a memory field which is adapted to store the characteristic data of the solid image capturing device by a non-optical means. Therefore, while having the same effect as that of a solid image capturing device using optical data storage, this solid image capturing device ensures reliable output of the characteristic data of the solid image capturing device.

A lens unit of the invention includes a solid image capturing device which has the configuration described but also integrally combined with a lens. Therefore, even if the lens unit currently mounted on the main body of the image capturing apparatus is replaced with another lens unit, the characteristics of each solid image capturing device can be determined by a component incorporated in the main body of the image capturing apparatus. Because of this feature, the lens unit is applicable to a camera system adapted to freely use interchangeable lens units respectively provided with solid image capturing devices of different types.

Because an image capturing apparatus claimed of the invention includes a solid image capturing device and calls for processing data output from the solid image capturing device by using a processing circuit and, by using a determining means, determining the characteristic data of the solid image capturing device processed by the processing means, the image capturing apparatus of the invention is capable of easily determining the characteristic data of the solid image capturing device, which is processed together with image data.

By using a lens unit defined above, an image capturing apparatus of the invention provides a camera system which is capable of determining the characteristics of each solid image capturing device by means of a component incorporated in the image capturing apparatus body, regardless of whether the lens unit currently used is replaced with another lens unit, so that interchangeable lens units respectively provided with solid image capturing devices of different types can be used.

Because a solid image capturing device as described is used, a component incorporated in the image capturing apparatus body is capable of determining the determination of the characteristics of each solid image capturing device, regardless of whether the solid image capturing device currently used is replaced with another solid image capturing device. Therefore, an image capturing apparatus according to the invention is capable of providing a camera system adapted to freely use interchangeable solid image capturing devices of different types.

An image capturing apparatus according to the invention functions in such a manner that data output from the solid image capturing device is processed by a processing circuit and the characteristic data of the solid image capturing device processed by the processing circuit is determined by a determining means. Therefore, while having the same effects as those of an image capturing apparatus as described above, the image capturing apparatus of the invention is capable of easily determining the characteristic data of the solid image capturing device, which is processed together with image data.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A solid image capturing apparatus comprising:
   an image capturing device;
   said image capturing device includes means for receiving an optical image;
   means responsive to said optical image for conducting photoelectric conversion of said optical image to produce an image output signal;
   means for generating characteristic data of said image capturing device to produce a characteristic data signal;
   an output terminal;
   means for outputting an output signal from output terminal; and
   said means for outputting including means for outputting said output signal including both said image output signal and said characteristic data signal,
   wherein said image capturing device includes an image field;
   said image field includes an effective image field and an invalid image field;
   said invalid image field includes characteristic data of said solid image capturing device;
   said solid image capturing device includes an optical mask covering said invalid image field; and
   said optical mask includes a memory field which optically stores said characteristic data.

2. A solid image capturing apparatus as claimed in claim 1, wherein said invalid image filed is located outside said effective image filed.

3. A solid image capturing apparatus, comprising:
   an image capturing device;
   said image capturing device includes means for receiving an optical image;
   means responsive to said optical image for conducting photoelectric conversion of said optical image to produce an image output signal;
   means for generating characteristic data of said image capturing device to produce a characteristic data signal;
   an output terminal;
   means for outputting an output signal from output terminal; and
   said means for outputting including means for outputting said output signal including both said image output signal and said characteristic data signal,
   wherein said image capturing device includes an image field;
   said image field includes an effective image field and an invalid image field;
   said invalid image field includes characteristic data of said solid image capturing device;
   said invalid image field includes a first memory field;
   said first memory field includes non-optical means for storing said characteristic data;
   said solid image capturing device includes an optical mask covering said invalid image field; and
   said optical mask includes a second memory field for optically storing said characteristic data.

4. A solid image capturing apparatus according to claim 1, further comprising:
   a lens; and
   said lens being integrally combined with said solid image capturing device.

5. A solid image capturing apparatus according to claim 1, further comprising:
   a processing circuit for processing data output from said output terminal; and
   a determining means for determining said characteristic data from said output signal.

6. A solid image capturing apparatus according to claim 4, further comprising:
   said lens unit containing said means for generating characteristic data;
   a main body of said image capturing apparatus; and
   said lens unit is adapted for interchangeable mounting on said main body, whereby, whenever a lens is changed, characteristic data associated with said new lens is automatically available to said solid image capturing apparatus.

7. An image capturing apparatus according to claim 1, further comprising:
   a main body of the image capturing apparatus;
   a lens unit;
   means for permitting interchangeable mounting of said lens unit on said main body; and
   said lens unit including therein said image capturing device.

8. An image capturing apparatus as claimed in claim 6, further comprising:
   a processing circuit for processing said output signal; and
   a determining means for determining data that is characteristic to the solid image capturing device and processed by the processing circuit.

9. An image capturing apparatus as claimed in claim 7, wherein said main body includes:
   a processing circuit for processing said output signal; and
   a determining means for determining data that is characteristic to said solid image capturing device and processed by the processing circuit.

10. An image capturing apparatus according to claim 9, wherein:
    said output signal includes said characteristic data and said image output signal; and
    said determining means time separating said characteristic data from said image output signal, whereby a single output signal is enabled to contain both said characteristic data and said image output signal without interference therebetween.

11. An image capturing device according to claim 10, wherein said characteristic data is contained in a field outside of a field that generates said image output signal.

* * * * *